US012240940B2

United States Patent
Oyama et al.

(10) Patent No.: US 12,240,940 B2
(45) Date of Patent: Mar. 4, 2025

(54) EPOXY RESIN, EPOXY RESIN CURED PRODUCT, AND EPOXY RESIN COMPOSITION

(71) Applicants: NATIONAL UNIVERSITY CORPORATION YOKOHAMA NATIONAL UNIVERSITY, Yokohama (JP); DIC Corporation, Tokyo (JP)

(72) Inventors: Toshiyuki Oyama, Yokohama (JP); Yuichiro Tokoro, Yokohama (JP); Seiryu Umetani, Yokohama (JP)

(73) Assignees: NATIONAL UNIVERSITY CORPORATION YOKOHAMA NATIONAL UNIVERSITY, Yokohama (JP); DIC Corporation, Tokyo (JP)

( * ) Notice: Subject to any disclaimer, the term of this patent is extended or adjusted under 35 U.S.C. 154(b) by 234 days.

(21) Appl. No.: 17/639,692

(22) PCT Filed: Sep. 8, 2020

(86) PCT No.: PCT/JP2020/034004
§ 371 (c)(1),
(2) Date: Mar. 2, 2022

(87) PCT Pub. No.: WO2021/059971
PCT Pub. Date: Apr. 1, 2021

(65) Prior Publication Data
US 2022/0289901 A1    Sep. 15, 2022

(30) Foreign Application Priority Data
Sep. 24, 2019    (JP) .................................. 2019-173582

(51) Int. Cl.
*C08G 59/24* (2006.01)
*C08G 59/50* (2006.01)
*C08G 59/62* (2006.01)

(52) U.S. Cl.
CPC ....... *C08G 59/245* (2013.01); *C08G 59/5033* (2013.01); *C08G 59/62* (2013.01)

(58) Field of Classification Search
None
See application file for complete search history.

(56) References Cited

U.S. PATENT DOCUMENTS

2011/0263754 A1    10/2011  Wilson et al.
2015/0315432 A1    11/2015  Wilson et al.
(Continued)

FOREIGN PATENT DOCUMENTS

GB    1098884 A    1/1968
JP    2009-235165 A    10/2009
(Continued)

OTHER PUBLICATIONS

Causa et al. "Synthesis and Characterization of cis- and trans-1,4-dimethylenecyclohexane diepoxide" J. Org. Chem. vol. 38, No. 7, pp. 1385-1387 (Year: 1973).*
(Continued)

*Primary Examiner* — Megan McCulley
(74) *Attorney, Agent, or Firm* — Locke Lord LLP; James E. Armstrong, IV; Nicholas J. DiCeglie, Jr.

(57) ABSTRACT

The present invention provides an epoxy resin having good heat resistance when formed into an epoxy resin cured product, and also provides an epoxy resin cured product an epoxy resin composition. The epoxy resin is represented by formula (1) below.

(Continued)

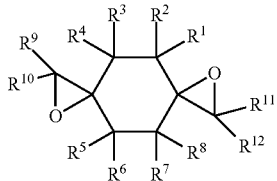

(1)

In the formula (1), $R^1$ to $R^{12}$ are each independently a hydrogen atom, a halogen atom, a hydroxyl group, an alkoxy group, an aralkyloxy group, an aryloxy group, a nitro group, an amino group, an amide group, a carboxyl group, an alkyloxycarbonyl group, an aryloxycarbonyl group, a formyl group, a cyano group, an alkyl group, a cycloalkyl group, an aralkyl group, or an aryl group.

8 Claims, 4 Drawing Sheets

(56) References Cited

U.S. PATENT DOCUMENTS

2016/0093547 A1 3/2016 Kim et al.
2020/0002465 A1 1/2020 Harada et al.

FOREIGN PATENT DOCUMENTS

| JP | 2012-514668 A | 6/2012 |
| JP | 2016-069631 A | 5/2016 |
| WO | 2018/168862 A1 | 9/2018 |

OTHER PUBLICATIONS

G. B. Payne, Tetrahedron, 18, 763 (Year: 1962).*
G.B. Payne, P.H. Deming and P.H. Williams, J. Org. Chem, 26, 659 (Year: 1961).*
A.G. Causa et al., "Synthesis and Characterization of cis- and trans-1,4-Dimethylenecyclohexane Diepoxide," J. Org. Chem., vol. 38, No. 7, 1973, pp. 1385-1387. (cited in the ISR).
M. Becker, "Synthesis von Bis-epoxiden aus Dicarbonylverbindungen und Methylenbromid/Butyllithium," Chem. Bet., 108, 1975, pp. 2391-2396. (cited in the ISR).
Japan Society of Epoxy Resin Technology, "Review, Recent Developments in Epoxy Resins", pp. 3-11 (2009) with machine English translation. (discussed in the spec).
A. Takahashi, "Heat-Resistant polymeric materials used in automotive electronics," Network Polymer, vol. 33, No. 1, 2012, pp. 34-41 with machine English translation. (discussed in the spec).

* cited by examiner

EPOXY RESIN, EPOXY RESIN CURED PRODUCT, AND EPOXY RESIN COMPOSITION

TECHNICAL FIELD

The present invention relates to an epoxy resin, an epoxy resin cured product, and an epoxy resin composition.

BACKGROUND ART

Epoxy resins have excellent heat resistance, mechanical characteristics, adhesiveness, and electrical insulation, and are thus used by utilizing these characteristics in various fields of an adhesive, a coating material, a construction/civil engineering material, and the like. On the other hand, as the utilization is expanded to the fields of aircraft materials, semiconductor sealing materials, and the like, higher heat resistance is required. With respect to this problem, an attempt is made to suppress the micro-Brownian motion by introducing a rigid skeleton or high-symmetry skeleton into a molecular structure, thereby improving physical heat resistance (Non-Patent Literature 1). Also, an attempt is made to improve chemical heat resistance by increasing the concentration of an aromatic ring structure or alicyclic structure, which is hardly thermally decomposed, in a molecular structure (Non-Patent Literature 2).

CITATION LIST

Non-Patent Literature

NPL 1: Japan Society of Epoxy Resin Technology, "Review, Recent Developments in Epoxy Resins", p 3-11 (2009)

NPL 2: Akio Takahashi, Network Polymer, Vol. 33, 34-41 (2012)

SUMMARY OF INVENTION

Technical Problem

However, a general epoxy resin has a glycidyl ether structure as represented by bisphenol A diglycidyl ether (DGEBA), and thus heat resistance cannot be avoided from being decreased due to a —O—CH$_2$— site in its structure. Therefore, difficulty often rises in significantly improving the heat resistance of an epoxy resin.

There is an alicyclic epoxy resin or the like which does not contain a glycidyl ether structure, but such an epoxy resin has substituents at both carbon atoms of an epoxy ring, and thus has low reactivity with a curing agent such as a polyfunctional amine or polyfunctional phenol. Also, the alicyclic epoxy resin is produced by olefin oxidation reaction using a peroxide, and thus there is concern about safety during production.

In consideration of the problem described above, a problem of the present invention is to provide an epoxy resin having good heat resistance when formed into a cured product, and also provide an epoxy resin cured product and an epoxy resin composition.

Solution to Problem

As a result of repeated earnest studies, the inventors found that the problem described above can be solved by providing an epoxy resin represented by any one of formulae (1) to (8) and (30) to (32) below.

In an aspect, the present invention relates to an epoxy resin represented by any one of formulae (1) to (8) and (30) to (32) below.

[Chem. 1]

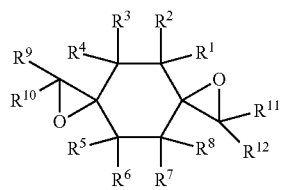
(1)

[Chem. 2]

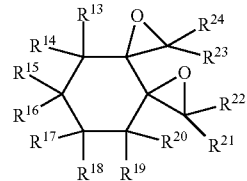
(2)

[Chem. 3]

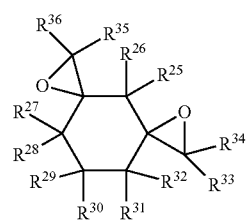
(3)

[Chem. 4]

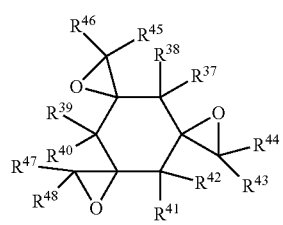
(4)

[Chem. 5]

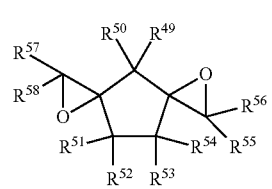
(5)

[Chem. 6]

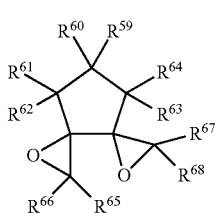
(30)

-continued

[Chem. 7]

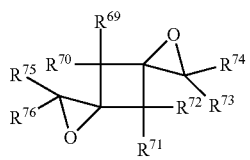

(6)

[Chem. 8]

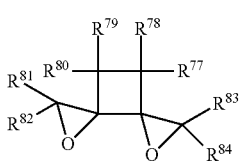

(31)

[Chem. 9]

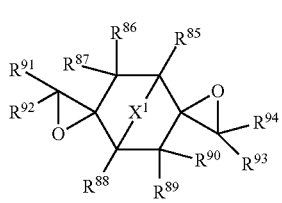

(7)

[Chem. 10]

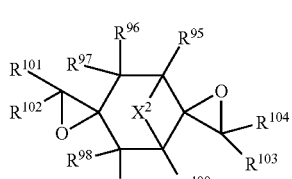

(32)

[Chem. 11]

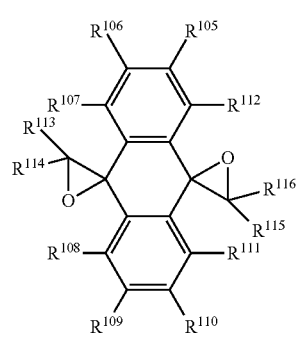

(8)

(In the formulae (1) to (8) and (30) to (32), $R^1$ to $R^{116}$ are each independently a hydrogen atom, a halogen atom, a hydroxyl group, an alkoxy group, an aralkyloxy group, an aryloxy group, a nitro group, an amino group, an amide group, a carboxyl group, an alkyloxycarbonyl group, an aryloxycarbonyl group, a formyl group, a cyano group, an alkyl group, a cycloalkyl group, an aralkyl group, or an aryl group. In the formulae (7) and (32), $X^1$ and $X^2$ are each independently a carbonyl group, an oxygen atom, an amino group (—N<), a sulfur atom, a sulfoxide group, a sulfonyl group, or a hydrocarbon group having 1 to 12 carbon atoms.)

In another aspect, the present invention relates to an epoxy resin cured product produced by curing the epoxy resin of the present invention.

In still another aspect, the present invention relates to an epoxy resin cured product produced by curing the epoxy resin of the present invention with a curing agent represented by formula (9) below.

[Chem. 12]

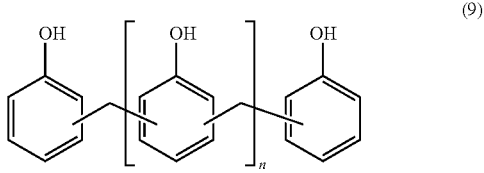

(9)

(In the formula (9), n is a positive integer.)

In a further aspect, the present invention relates to an epoxy resin cured product produced by curing the epoxy resin of the present invention with a curing agent represented by formula (10) below.

[Chem. 13]

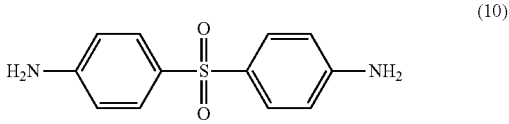 [SMILES: Nc1ccc(S(=O)(=O)c2ccc(N)cc2)cc1]

(10)

In a still further aspect, the present invention relates to an epoxy resin cured product produced by curing the epoxy resin of the present invention with a curing agent represented by formula (11) below.

[Chem. 14]

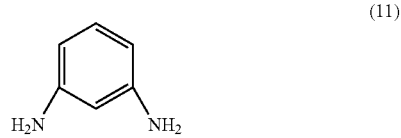

(11)

In a still further aspect, the present invention relates to an epoxy resin cured product produced by curing the epoxy resin of the present invention with a curing agent represented by formula (36) below.

[Chem. 15]

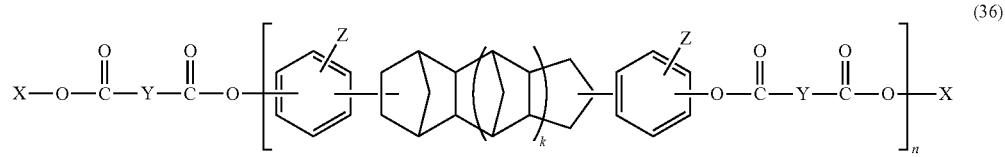

(36)

(In the formula, X is a benzene ring, a naphthalene ring, a benzene ring or naphthalene ring nuclear-substituted by an alkyl group having 1 to 4 carbon atoms, or a biphenyl group, Y is a benzene ring, a naphthalene ring, or a benzene ring or naphthalene ring nuclear-substituted by an alkyl group having 1 to 4 carbon atoms, Z is an alkyl group having 1 to 4 carbon atoms, k represents 0 or 1, and n is average repeat units of 0.25 to 3.0.)

In a still further aspect, the present invention relates to an epoxy resin composition containing the epoxy resin represented by any one of the formulas (1) to (8) and (30) to (32) and a curing agent.

According to an embodiment of the present invention, the curing agent of the epoxy resin is at least one of the compounds represented by the formulae (9) to (11) and (36).

Advantageous Effects of Invention

The present invention can provide an epoxy resin having good heat resistance when formed into a cured product, and also provide an epoxy resin cured product and an epoxy resin composition.

DESCRIPTION OF EMBODIMENTS (Epoxy Resin)

Figure 1:
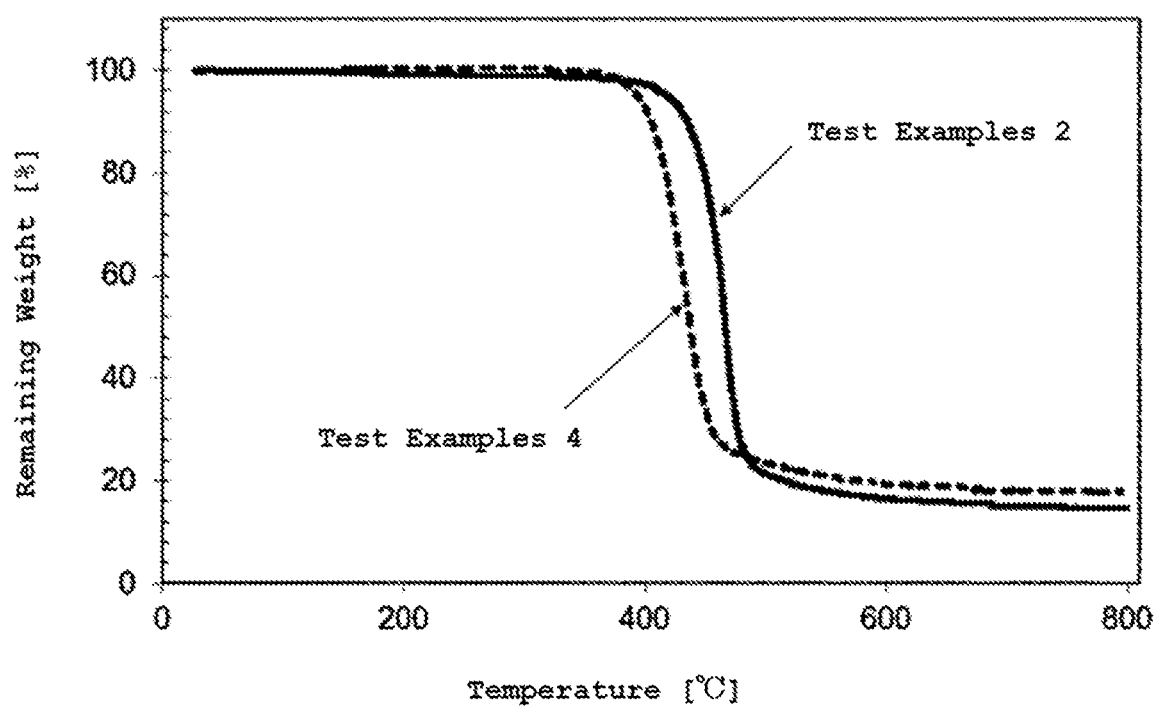
FIG. 1 is a graph showing TGA measurement results relating to Test Examples 2 and 4.

An epoxy resin of the present invention is represented by any one of formulae (1) to (8) and (30) to (32) below.

[Chem. 16]

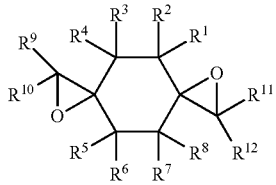

(1)

[Chem. 17]

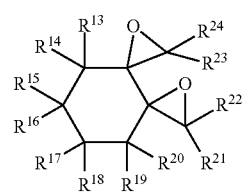

(2)

[Chem. 18]

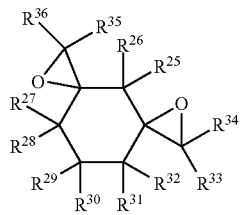

(3)

[Chem. 19]

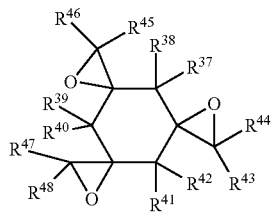

(4)

[Chem. 20]

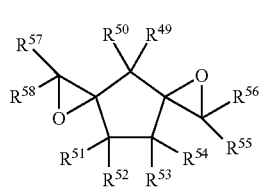

(5)

[Chem. 21]

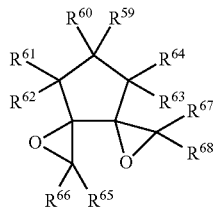

(30)

[Chem. 22]

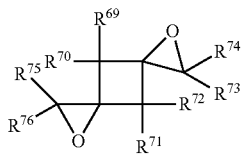

(6)

[Chem. 23]

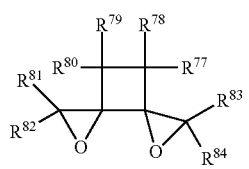

(31)

[Chem. 24]

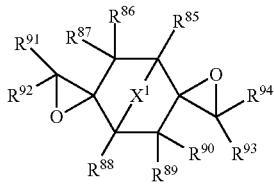

(7)

[Chem. 25]

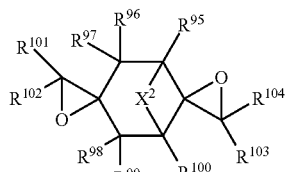

(32)

[Chem. 26]

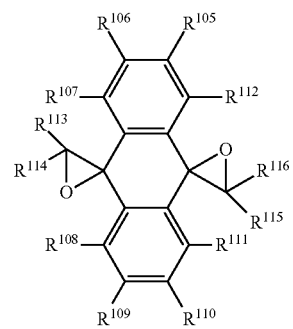

(8)

The epoxy resin of any one of the formulae (1) to (8) and (30) to (32) does not have a —O—CH$_2$— site in its structure and thus has good heat resistance.

In the formulae (1) to (8) and (30) to (32), R$^1$ to R$^{116}$ are each independently a hydrogen atom, a halogen atom, a hydroxyl group, an alkoxy group, an aralkyloxy group, an aryloxy group, a nitro group, an amino group, an amide group, a carboxyl group, an alkyloxycarbonyl group, an aryloxycarbonyl group, a formyl group, a cyano group, an alkyl group, a cycloalkyl group, an aralkyl group, or an aryl group. Herein, R$^1$ to R$^{116}$ are each preferably a hydrogen atom, an alkyl group, or a cycloalkyl group. In the formulae (7) and (32), X$^1$ and X$^2$ are each independently a carbonyl group, an oxygen atom, an amino group (—N<), a sulfur atom, a sulfoxide group, a sulfonyl group, or a hydrocarbon group having 1 to 12 carbon atoms. The hydrocarbon group having 1 to 12 carbon atoms may be an alkylene group (—(CR$^{117}$R$^{118}$)$_n$—). In this case, the same group as the group which can be used as each of R$^1$ to R$^{116}$ can be used as each of R$^{117}$ and R$^{118}$. Also, n is a positive integer. The hydrocarbon group having 1 to 12 carbon atoms may also be an arylene group, a cyclohexylene group. or the like. Further, an alkylene group may be branched in the middle thereof and may have an ether bond, an amino bond, a carbonyl bond, an ester bond, an amide bond, a urethane bond, a urea bond, or the like which is introduced in the middle thereof. Herein, X$^1$ and X$^2$ are each more preferably a methylene group or an oxygen atom. Specific examples thereof include epoxy resins represented by the formulae (12) to (19) and (33) to (35) in which R$^1$ to R$^{116}$ are each independently a hydrogen atom, and X$^1$ and X$^2$ are each independently a CH$_2$ group.

[Chem. 27]

(12)

[Chem. 28]

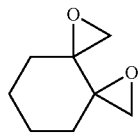

(13)

[Chem. 29]

(14)

[Chem. 30]

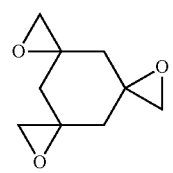

(15)

[Chem. 31]

(16)

[Chem. 32]

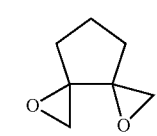

(33)

[Chem. 33]

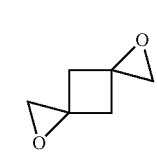

(17)

[Chem. 34]

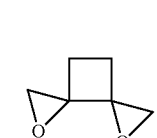

(34)

[Chem. 35]

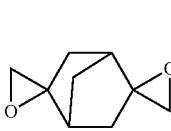

(18)

[Chem. 36]

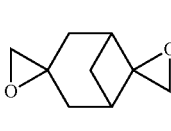

(35)

[Chem. 37]

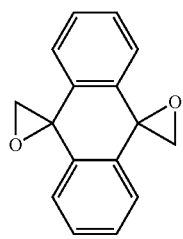

(19)

(Method for Producing Epoxy Resin)

Next, a method for producing the epoxy resin of the present invention is described in detail. The epoxy resin of the present invention can be produced by Corey-Chaykovsky reaction of the sulfur ylide generated from trimethylsulfonium bromide or trimethylsulfonium iodide with polyfunctional aldehyde or ketone. Such a production method can produce an epoxy resin not having a —O—CH$_2$— site in its structure. Also, olefin oxidation reaction using a peroxide is not required for production, thereby improving safety during production. In view of the chemical formula of the desired epoxy resin, an aldehyde or ketone having a proper substituent or the like at a proper position is selected as the polyfunctional aldehyde or ketone.

A method for producing the epoxy resin represented by the formula (12) is described below as an example. First, an organic solvent, water, and an alkali such as KOH or the like are added to trimethylsulfonium bromide or trimethylsulfonium iodide and then stirred. Then, a solution prepared by dissolving 1,4-cyclohexanedione represented by formula (20) below in an organic solvent is added and again stirred, and reaction is allowed to proceed according to reaction formula represented by formula (21) below. After the reaction, the reaction mixture is cooled to room temperature and subjected to suction filtration and liquid separation. Then, an organic layer is washed and dried, filtered, and concentrated/dried under reduced-pressure, producing the epoxy resin represented by formula (12).

[Chem. 38]

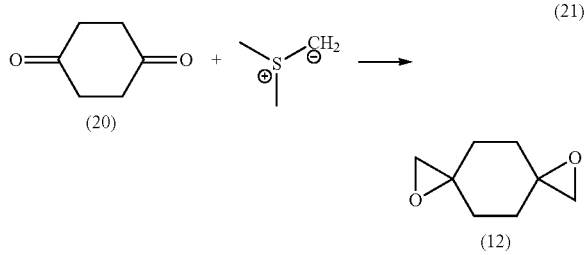

(21)

In addition, another method for producing the epoxy resin represented by the formula (12) is described. First, 1,4-cyclohexanedione is added to trimethylsulfonium bromide or trimethylsulfonium iodide, and the reaction system is brought into an inert atmosphere by Ar substitution or the like. Then, an organic solvent such as anhydrous DMSO or the like is added and stirred. Then, a solution prepared by dissolving a base such as potassium tert-butoxide or the like in an organic solvent is added and stirred, and reaction is allowed to proceed according to a reaction formula represented by formula (21) below. After the reaction, the reaction mixture is cooled to room temperature and subjected to suction filtration and liquid separation. Then, an organic layer is washed and then dried, filtered, and concentrated/dried under reduced-pressure, producing the epoxy resin represented by the formula (12).

Trimethylsulfonium bromide or trimethylsulfonium iodide is preferably used in an amount of 2 to 4 moles per mole of 1,4-cyclohexanedione. The reaction conditions may be appropriately determined, and for example, the reaction temperature is preferably 45° C. to 75° C. and more preferably 55° C. to 65° C. The reaction time is preferably 4 to 8 hours and more preferably 5 to 6 hours. In addition, acetonitrile, dimethyl sulfoxide, tetrahydrofuran, or the like can be used as the organic solvent.

The structure of the resultant epoxy resin can be confirmed by a general organic analytical method such as a 1H-nuclear magnetic resonance (NMR) spectral method, a 13C-NMR spectral method, a 19F-NMR spectral method, an infrared absorption (IR) spectral method using Fourier transform infrared spectroscopy (FT-IR) or the like, a mass spectrometry (MS) method, an elemental analysis method, a X-ray crystal diffraction method, or the like.

(Epoxy Resin Cured Product)

An epoxy resin cured product of the present invention is an epoxy resin cured product produced by curing the epoxy resin of the present invention. A general known curing agent for epoxy resins can be used as the curing agent used for curing the epoxy resin of the present invention. Examples of the known curing agent for epoxy resins include an acid anhydride-based compound, a phenol-based compound, an amine-based compound, an active ester-based compound, and the like.

Examples of the acid anhydride-based compound as the curing agent include phthalic anhydride, trimellitic anhydride, pyromellitic anhydride, maleic anhydride, polypropylene glycol maleic anhydride, tetrahydrophthalic anhydride, methyltetrahydrophthalic anhydride, methylnadic anhydride, hexahydrophthalic anhydride, methylhexahydrophthalic anhydride, and the like.

Examples of the phenol-based compound as the curing agent include a dicyclopentadiene phenol addition-type resin, a phenol aralkyl resin, a naphthol aralkyl resin, a triphenylolmethane resin, a tetraphenylolethane resin, naphthol novolac resin, a naphthol-phenol condensation novolac resin, a naphthol-cresol condensation novolac resin, biphenyl-modified phenol resin, an aminotriazine-modified phenol resin, and modified products thereof, and the like.

Any amine compound, regardless of aliphatic amine or aromatic amine, can be used as the amine-based compound as the curing agent. Examples of the amine-based compound as the curing agent include aliphatic polyamines such as ethylene diamine, propylene diamine, butylene diamine, hexamethylene diamine, polypropylene glycol diamine, diethylene triamine, triethylene tetramine, pentaethylene hexamine, and the like; aromatic polyamines such as metaxylylene diamine, diaminodiphenylmethane, diaminodiphenylsulfone, phenylene diamine, and the like: alicyclic polyamines such as 1,3-bis(aminomethyl)cyclohexane, isophorone diamine, norbornane diamine, and the like; dicyan diamide; and the like.

The active ester-based compound is not particularly limited, but preferably used are compounds each having two or more ester groups with high reaction activity in one molecule, such as phenol esters, thiophenol esters, N-hydroxyamine esters, heterocyclic hydroxy compound esters, and the like. An active ester resin as the active ester-based compound is preferably produced by condensation reaction of a carboxylic acid compound and/or thiocarboxylic acid compound with a hydroxy compound and/or thiol compound. In particular, from the viewpoint of improvement in heat resistance, preferred is the active ester resin produced from a carboxylic acid compound or a halide thereof and a hydroxy compound, and more preferred is the active ester resin produced from a carboxylic acid compound or a halide thereof and a phenol compound and/or naphthol compound. Examples of the carboxylic acid compound include benzoic acid, acetic acid, succinic acid, maleic acid, itaconic acid, phthalic acid, isophthalic acid, terephthalic acid, pyromellitic acid, and halides thereof. Examples of the phenol compound or naphthol compound include hydroquinone, resorcin, bisphenol A, bisphenol F, bisphenol S, dihydroxydiphenyl ether, phenol phthalein, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,7-dihydroxynaphthalene, polyhydroxynaphthylene ether, dihydroxybenzophenone, trihydroxybenzophenone, tetrahydroxybenzophenone, phloroglucin, benzenetriol, dicyclopentadiene-phenol addition-type resin, and the like.

Specifically, the active ester-based compound is preferably an active ester resin containing a dicyclopentadiene-phenol addition structure, an active ester resin containing a naphthalene structure, an active ester resin which is an acetylated compound of phenol novolac, an active ester resin which is a benzoylated compound of phenol novolac, or the like, and in view of excellent improvement in peel strength, an active ester resin containing a dicyclopentadiene-phenol addition structure and an active ester resin containing a naphthalene structure are more preferred. A more specific example of the active ester resin containing a dicyclopentadiene-phenol addition structure is a compound represented by formula (36) below.

[Chem. 39]

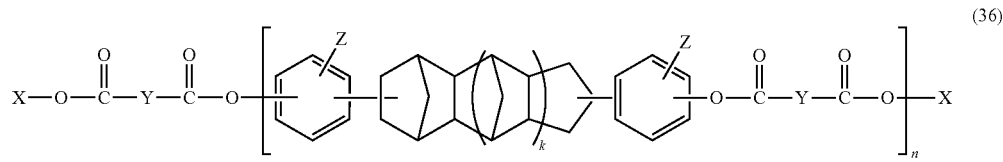

(36)

(In the formula, X is a benzene ring, a naphthalene ring, a benzene ring or naphthalene ring nuclear-substituted by an alkyl group having 1 to 4 carbon atoms, or a biphenyl group, Y is a benzene ring, a naphthalene ring, or a benzene ring or naphthalene ring nuclear-substituted by an alkyl group having 1 to 4 carbon atoms, Z is an alkyl group having 1 to 4 carbon atoms, k represents 0 or 1, and n is average repeat units of 0.25 to 3.0.)

The epoxy resin cured product of the present invention may be produced by repeatedly polymerizing and curing the epoxy resin of the present invention or may further contain a repeat unit derived from the curing agent. For example, the cured product produced by curing the epoxy resin represented by the formula (12) with a curing accelerator such as imidazoles or the like has a repeat unit represented by formula (22) or (23) below.

[Chem. 40]

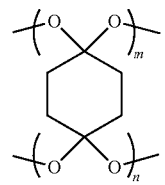

(22)

(In the formula (22), n and m are each a positive integer.)

[Chem. 41]

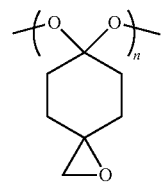

(23)

(In the formula (23), n is a positive integer.)

The epoxy resin cured product of the present invention may be produced by curing the epoxy resin of the present invention with a curing agent (phenol novolac: PN) represented by formula (9) below.

[Chem. 42]

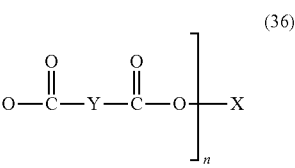

(9)

(In the formula (9), n is a positive integer.)

The epoxy resin cured product of the present invention produced by curing the epoxy resin represented by the formula (12) with the curing agent represented by the formula (9) ideally becomes a cured product containing a repeat unit represented by the formula (24). However, some of epoxy groups and phenolic OH groups may not be reacted.

[Chem. 43]

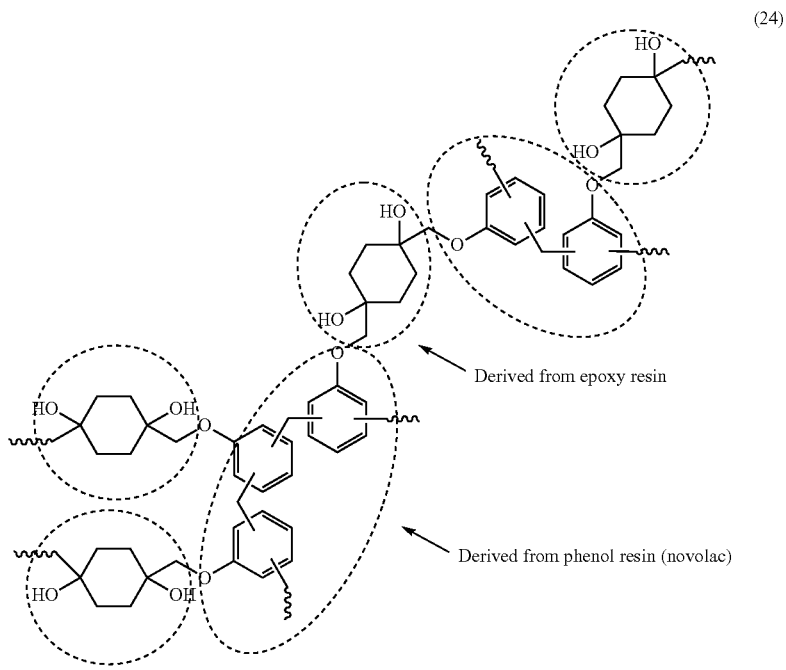

(24)

← Derived from epoxy resin

← Derived from phenol resin (novolac)

The epoxy resin cured product of the present invention may be produced by curing the epoxy resin of the present invention with a curing agent (4,4'-diaminodiphenylsulfone: DDS) represented by formula (10) below.

[Chem. 44]

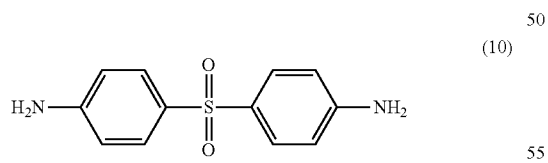

(10)

The epoxy resin cured product of the present invention produced by curing the epoxy resin represented by the formula (12) with the curing agent represented by the formula (10) ideally becomes a cured product containing a repeat unit represented by the formula (25). However, sone of epoxy groups and amino groups may not be reacted.

[Chem. 45]

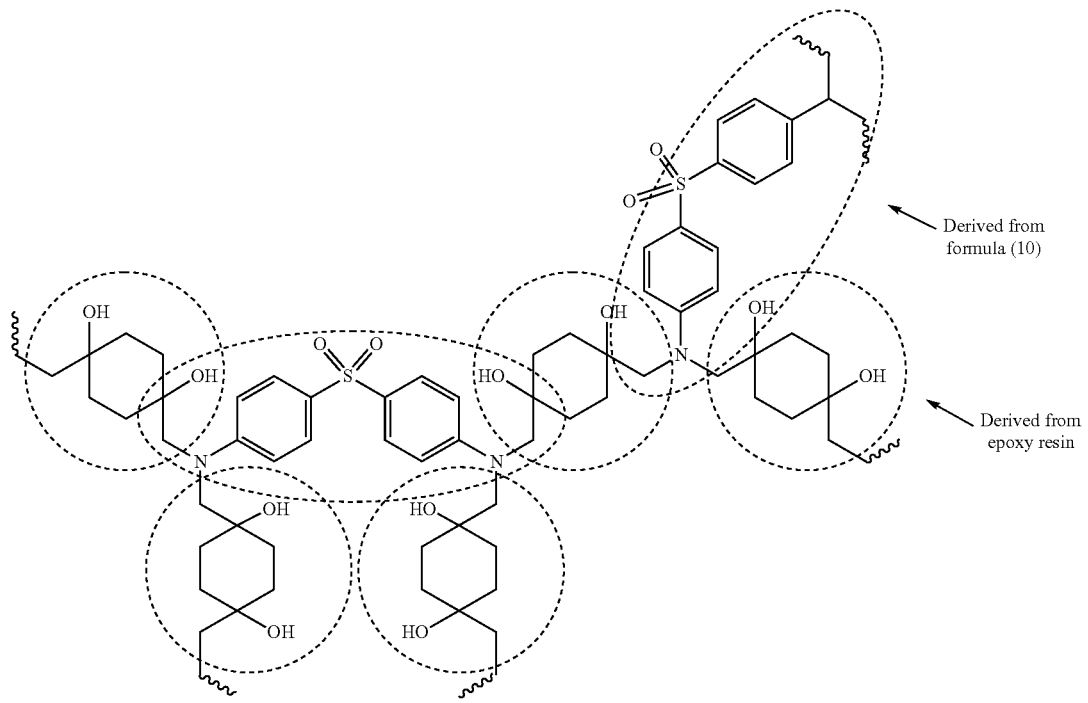

(25)

The epoxy resin cured product of the present invention may be produced by curing the epoxy resin of the present invention with a curing agent (m-phenylenediamine) represented by formula (11).

[Chem. 46]

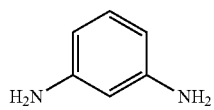

(11)

The epoxy resin cured product of the present invention produced by curing the epoxy resin represented by the formula (12) with the curing agent represented by the formula (11) ideally becomes a cured product containing a repeat unit represented by the formula (26). However, some of epoxy groups and amino groups may not be reacted.

[Chem. 47]

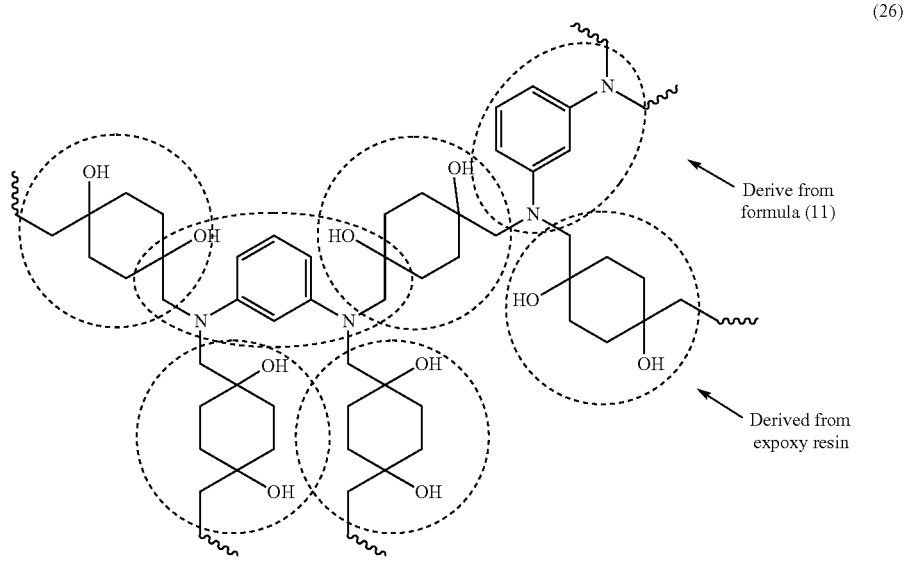

(Method for Producing Epoxy Resin Cured Product)

Next, a method for producing the epoxy resin cured product of the present invention is described in detail. The epoxy resin cured product of the present invention can be produced by curing the epoxy resin of the present invention. A general known curing agent such as a curing accelerator (2E4MZ-CN) or the like represented by formula (27) below can be used as the curing agent used for curing.

[Chem. 48]

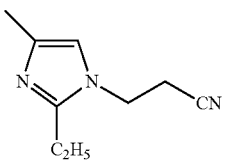

(27)

A method for producing the epoxy resin cured product by curing the epoxy resin represented by the formula (12) is described below as an example. First, an organic solvent such as acetone or the like is added to the epoxy resin represented by the formula (12) and stirred. Then, the curing agent represented by the formula (9), (10), or (11) is added and reacted by stirring again, and then concentrated and dried under reduced pressure, thereby producing an epoxy resin cured product produced by curing the epoxy resin represented by the formula (12).

Besides the curing agent, a curing accelerator may be used for curing the epoxy resin. A known curing accelerator can be used as the curing accelerator for the epoxy resin.

The structure of the resultant epoxy resin cured product can be confirmed by an infrared absorption (IR) spectral method using Fourier transform infrared spectroscopy (FT-IR) or the like, an elemental analysis method, a X-ray scattering method, or the like.

(Epoxy Resin Composition)

An epoxy resin composition of the present invention contains an epoxy resin represented by any one of the formulae (1) to (8) and (30) to (32), and a curing agent. The epoxy resin cured product of the present invention can be produced by further mixing and reacting the epoxy resin composition with the curing accelerator.

A curing agent which can be used for producing the epoxy resin cured product of the present invention can be used as the curing agent contained in the epoxy resin composition of the present invention. Also, a curing accelerator which can be used for producing the epoxy resin cured product of the present invention can be used as the curing accelerator which can be used for curing reaction of the epoxy resin composition of the present invention.

The epoxy resin composition of the present invention may further contain an epoxy resin (other epoxy resin) other than the epoxy resin represented by any one of the formulae (1) to (8) and (30) to (32), a filler, a fibrous substrate, a dispersion medium, a resin other than the compounds described above, etc. Each of the contained materials is specifically described in detail below.

(Other Epoxy Resin)

The epoxy resin composition of the present invention may also use another epoxy resin besides the epoxy resin represented by any one of the formulae (1) to (8) and (30) to (32) within a range not impairing the effect of the present invention. In this case, the content of the epoxy resin represented by any one of the formulae (1) to (8) and (30) to (32) used in the epoxy resin composition of the present invention is preferably 30% by mass or more and particularly preferably 40% by mass or more in the whole epoxy resin.

Examples of the epoxy resin which can be simultaneously used include, but are not limited to, liquid epoxy resins such as a bisphenol A type epoxy resin, a bisphenol F type epoxy resin, a bisphenol S type epoxy resin, a bisphenol AD type epoxy resin, a resorcin type epoxy resin, a hydroquinone type epoxy resin, a catechol type epoxy resin, a dihydroxynaphthalene type epoxy resin, a biphenyl type epoxy resin, a tetramethylbiphenyl type epoxy resin, and the like, brominated epoxy resins such as a brominated phenol novolac type epoxy resin and the like, a solid bisphenol A type epoxy resin, a phenol novolac type epoxy resin, a cresol novolac type epoxy resin, a triphenylmethane type epoxy resin, a tetraphenylethane type epoxy resin, a dicyclopentadiene-phenol addition reaction type epoxy resin, a phenol aralkyl type epoxy resin, a phenylene ether type epoxy resin, a naphthylene ether type epoxy resin, a naphthol novolac type epoxy resin, a naphthol aralkyl type epoxy resin, a naphthol-phenol condensation novolac type epoxy resin, a naphthol-cresol condensation novolac type epoxy resin, an aromatic hydrocarbon formaldehyde resin-modified phenol resin type epoxy resin, a biphenyl-modified novolac type epoxy resin, and the like. These may be used alone or in combination of two or more, and various epoxy resins are preferably selected and used according to the intended application, the physical properties of the cured product, etc.

The mixing amounts of the epoxy resin and the curing agent in the epoxy resin composition of the present invention are not particularly limited, but in view of the good mechanophysical properties of the resultant cured product etc., the amounts are preferably such that the active group in the curing agent is 0.7 to 1.5 equivalents relative to a total of 1 equivalent of epoxy groups in the whole amount of the epoxy resin.

(Filler)

The epoxy resin composition of the present invention may further contain a filler. Examples of the filler include an inorganic filler and an organic filler. The inorganic filler is, for example, inorganic fine particles.

Examples of the inorganic fine particles having excellent heat resistance include alumina, magnesia, titania, zirconia, silica (quartz, fumed silica, precipitated silica, silicic anhydride, fused silica, crystalline silica, superfine powder amorphous silica, and the like). Examples those having excellent thermal conductivity include boron nitride, aluminum nitride, aluminium oxide, titanium oxide, magnesium oxide, zinc oxide, silicon oxide, diamond, and the like. Examples of those having excellent conductivity include a metal filler and/or metal-coated filler using an elemental metal or alloy (for example, iron, copper, magnesium, aluminum, gold, silver. platinum, zinc, manganese, stainless, or the like), and the like. Examples of those having excellent barrier properties include minerals such as mica, clay, kaolin, talc, zeolite, wollastonite, smectite, and the like, potassium titanate, magnesium sulfate, sepiolite, zonolite, aluminum borate, calcium carbonate, titanium oxide, barium sulfate, zinc oxide, magnesium hydroxide, and the like. Examples of those having a high refractive index include barium titanate, zirconium oxide, titanium oxide, and the like. Examples of those showing a photocatalytic property include photocatalytic metals such as titanium, cerium, zinc, copper, aluminum, tin, indium, phosphorus, carbon, sulfur, tellurium, nickel, iron, cobalt, silver, molybdenum, strontium, chromium, barium, lead, and the like, composites of these metals, and oxides thereof, and the like. Examples of those having excellent abrasion resistance include metals and composites and oxide thereof such as silica, alumina, zirconia, magnesium oxide and the like. Examples of those having excellent conductivity include metals such as silver, copper, and the like, tin oxide, indium oxide, and the like. Examples of those having excellent insulation include silica and the like. Examples of those having an excellent ultraviolet shielding property include titanium oxide, zinc oxide, and the like.

The inorganic fine particles may be properly selected according to applications, and a single type or combination of plural types may be used. The inorganic fine particles have various characteristics other than the characteristics described above and thus may be property selected according to applications.

For example, when silica is used as the inorganic fine particles, known silica fine particles such as powdery silica, colloidal silica, or the like can be used without particular limitation. Examples of commercial powdery silica fine particles include Aerosil 50 and 200 manufactured by Nippon Aerosil Co., Ltd., Sildex H31, H32, H51, H52, H121, and H122 manufactured by Asahi Glass Company, Ltd., E220A and E220 manufactured by Nippon Silica Industry Co., Ltd., SYLYSIA 470 manufactured by Fuji Silysia Co., Ltd., SG Flake manufactured by Nippon Sheet Glass Company, Ltd., and the like. Examples of commercial colloidal silica include Methanol Silica Sol IPA-ST, MEK-ST, NBA-ST, XBA-ST, DMAC-ST, ST-UP, ST-OUP, ST-20, ST-40, ST-C, ST-N, ST-0, ST-50, and ST-OL manufactured by Nissan Chemical Industries, Ltd., and the like.

Surface-modified silica fine particles may be used, and examples thereof include the silica fine particles surface-treated with a reactive silane coupling agent having a hydrophilic group, and the silica fine particles modified with a compound having a (meth)acryloyl group. Examples of commercial powdery silica modified with a compound having a (meth)acryloyl group include Aerosil RM50 and $R^{711}$ manufactured by Nippon Aerosil Co., Ltd., and the like, and examples of commercial colloidal silica modified with a compound having a (meth)acryloyl group include MIBK-SD manufactured by Nissan Chemical Industries, Ltd, and the like.

The shape of the silica fine particles is not particularly limited, and a spherical shape, a hollow shape, a porous shape, a rod-like shape, a plate-like shape, a fibrous shape, or an undefined shape can be used. Also, the primary particle diameter is preferably within a range of 5 to 200 nm. With the primary particle diameter of 5 nm or more, the inorganic fine particles are sufficiently dispersed in a dispersion, while with the primary particle diameter of 200 nm or less, the satisfactory strength of a cured product can be easily maintained.

Not only an extender pigment but also an ultraviolet light responsive photocatalyst can be used as titanium oxide fine particles, and for example, anatase-type titanium oxide, rutile-type titanium oxide, brookite-type titanium oxide, and the like can be used. There also can be used particles designed to response to visible light by doping a hetero element in the crystal structure of titanium oxide. Examples of an element preferably doped in titanium oxide include anion elements such as nitrogen, sulfur, carbon, fluorine, phosphorus, and the like, and cation elements such as chromium, iron, cobalt, manganese, and the like. In addition, a powder or a sol or slurry dispersed in an organic solvent or water can be used as the form. Examples of commercial powdery titanium oxide fine particles include Aerosil P-25 manufactured by Nippon Aerosil Co., Ltd., ATM-100 manufactured by TAYCA Corporation, and the like. Examples of commercial slurry titanium oxide fine particles include TKD-701 manufactured by TAYCA Corporation, and the like.

(Fibrous Substrate)

The epoxy resin composition of the present invention may further contain a fibrous substrate. Preferred examples of the fibrous substrate include, but are not particularly limited to, those used for fiber-reinforced resins, such as inorganic fibers and organic fibers.

Examples of the inorganic fibers include inorganic fibers such as carbon fibers, glass fibers, boron fibers, alumina fibers, silicon carbide fibers, and the like, carbon fibers, activated carbon fibers, graphite fibers, glass fibers, tungsten carbide fibers, silicon carbide fibers (silicon carbide fibers), ceramic fibers, alumina fibers, natural fibers, mineral fibers such as basalt, boron fibers, boron nitride fibers, boron carbide fibers, metal fibers, and the like. Examples of the metal fibers include aluminum fibers, copper fibers, brass fibers, stainless fibers, and steel fibers.

Examples of the organic fibers include synthetic fibers composed of resin materials such as polybenzazole, aramid, PBO (polyparaphenylene benzoxazole), polyphenylene sulfide, polyester, acryl, polyamide, polyolefin, polyvinyl alcohol, polyarylate, and the like, natural fibers such as cellulose, pulp, cotton, wool, silk, and the like, regenerated fibers such as protein, polypeptide, alginic acid, and the like.

Among these, carbon fibers and glass fibers are preferred because of a wide range of industrial applications. Only one type of these or combination of plural types may be used.

The fibrous substrate may be a fiber assembly and may be composed of continuous fibers or discontinuous fibers, and a woven fabric or nonwoven fabric may be used. Also, the fibrous substrate may be a fiber bundle formed by arranging fibers in a direction and may have a sheet-like shape formed by arranging fiber bundles or a three-dimensional shape formed by giving a thickness to a fiber assembly.

(Dispersion Medium)

The epoxy resin composition of the present invention may use a dispersion medium for the purpose of adjusting the solid content and viscosity of the composition. The dispersion medium may be a liquid medium not impairing the effect of the present invention, and examples thereof include various organic solvents, liquid organic polymers, and the like.

Examples of the organic solvents include ketones such as acetone, methyl ethyl ketone (MEK), methyl isobutyl ketone (MIBK), and the like, cyclic ethers such as tetrahydrofuran (THF), dioxane, and the like, esters such as methyl acetate, ethyl acetate, butyl acetate, and the like, aromatics such as toluene, xylene, and the like, and alcohols such as carbitol, cellosolve, methanol, isopropanol, butanol, propylene glycol monomethyl ether, and the like. These can be used alone or in combination, and among these, methyl ethyl ketone is preferred in view of volatility and solvent recovery during coating.

The liquid organic polymer is a liquid organic polymer not contributing directly to curing reaction, and examples thereof include carboxyl group-containing polymer modified products (Florene G-900 and NC-500: Kyoeisha Chemical Co., Ltd.), acrylic polymers (Florene WK-20: Kyoeisha Chemical Co., Ltd.), special modified phosphate ester amine salts (HIPLAAD ED-251: Kusumoto Chemicals Co., Ltd.), modified acrylic block copolymers (DISPER BYK2000; BYK Chemie Co., Ltd.), and the like.

(Resin)

Also, the epoxy resin composition of the present invention may contain a resin other than the compounds of the present invention described above. A known common resin may be mixed as the resin within a range not impairing the effect of the present invention, and usable examples thereof include a heat-curable resin and a thermoplastic resin.

The heat-curable resin is a resin having the characteristic that it can be substantially changed to be insoluble and infusible during curing by a method such as heating, radiation, or a catalyst. Examples thereof include a phenol resin, a urea resin, a melamine resin, a benzoguanamine resin, an alkyd resin, an unsaturated polyester resin, a vinyl ester resin, a diallyl terephthalate resin, a silicone resin, a urethane resin, a furan resin, a ketone resin, a xylene resin, a heat-curable polyimide resin, a benzoxazine resin, an active ester resin, an aniline resin, a cyanate ester resin, a styrene-maleic anhydride (SMA) resin, a maleimide resin, and the like. These heat-curable resins can be used alone or in combination of two or more.

The thermoplastic resin represents a resin capable of being melt-molded by heating. Examples thereof include a polyethylene resin, a polypropylene resin, a polystyrene resin, a rubber-modified polystyrene resin, an acrylonitrile-butadiene-styrene (ABS) resin, an acrylonitrile-styrene (AS) resin, a polymethyl methacrylate resin, an acrylic resin, a polyvinyl chloride resin, a polyvinylidene chloride resin, a polyethylene terephthalate resin, an ethylene vinyl alcohol resin, a cellulose acetate resin, an ionomer resin, a polyacrylonitrile resin, a polyamide resin, a polyacetal resin, a polybutylene terephthalate resin, a polylactic acid resin, a polyphenylene ether resin, a modified polyphenylene ether resin, a polycarbonate resin, a polysulfone resin, a polyphenylene sulfide resin, a polyether imide resin, a polyether sulfone resin, a polyarylate resin, a thermoplastic polyimide resin, a polyamide-imide resin, a polyether ether ketone resin, a polyketone resin, a liquid crystal polyester resin, a fluorocarbon resin, a syndiotactic polystyrene resin, a cyclic polyolefin resin, and the like. These thermoplastic resins can be used alone or in combination of two or more.

(Application of Epoxy Resin Cured Product and Epoxy Resin Composition)

The epoxy resin cured product and epoxy resin composition of the present invention are excellent in both the chemical heat resistance and the physical heat resistance, and are thus useful for the applications below.

(Fiber-Reinforced Resin)

When the epoxy resin composition of the present invention contains the fibrous substrate and the fibrous substrate is reinforcing fibers, the epoxy resin composition containing the fibrous substrate can be used as a fiber-reinforced resin. A method for allowing the composition to contain the fibrous substrate is not particularly limited within a range not impairing the effect of the present invention, and a method of compounding the fibrous substrate and the composition by kneading, coating, impregnation, injection, pressure bonding, or the like can be used. The method can be properly selected according to the form of the fibers and application of the fiber-reinforced resin.

A method for molding the fiber-reinforced resin of the present invention is not particularly limited. When a plate-like product is produced, an extrusion molding method is general, but a planar press can also be used. Besides these, an extrusion molding method, a blow molding method, a compression molding method, a vacuum molding method, an injection molding method, or the like can be used. When a film-like product is produced, a melt extrusion method and a solution cast method can be used. When the melt molding method is used, examples of the method include inflation film molding, cast molding, extrusion lamination molding, calendar molding, sheet molding, fiber molding, blow molding, injection molding, rotational molding, coating, and the like. In the case of an active energy ray-curable resin, a cured product can be produced by various curing methods using active energy rays. In particular, when a heat-curable resin is a main component of a matrix resin, a molding method can be used, in which a prepreg of a molding material is formed and then heated under pressure by an autoclave, and other examples of the method include RTM (Resin Transfer Molding) molding, VaRTM (Vacuum assist Resin Transfer Molding) molding, lamination molding, hand layup molding, and the like.

(Prepreg)

The fiber-reinforced resin of the present invention can form a state called "uncured or semicured prepreg". After a product in a prepreg state is distributed, a cured product may be formed by final curing. In order to form a laminate, after the prepreg is formed, another layer is laminated thereon and then finally cured. This is preferred because the laminate including the layers adhered to each other can be formed.

The mass ratio of the composition to the fibrous substrate used in this method is not particularly limited, but is generally preferably adjusted so that the resin content in the prepreg is 20% to 60% by mass.

(Heat-Resistant Material and Electronic Material)

The epoxy resin composition of the present invention can be used as a heat-resistant material and an electronic material because the epoxy resin cured product using the composition has both good chemical heat resistance and good physical heat resistance. In particular, the composition can be preferably used as a semiconductor sealing material, a circuit board, a build-up film, a build-up substrate, and the like, and also as an adhesive and a resist material. Also, the composition can be preferably used as a matrix resin of a fiber-reinforced resin and is particularly suitable as a prepreg with high heat resistance. The resultant heat-resistant member and electronic member can be preferably used for various applications, and examples thereof include, but are not limited to, industrial machine parts, general machine parts, automotive/railway/vehicle parts, universe/aviation-related parts, electronic/electric parts, building materials, vessel/package members, living articles, sports/leisure articles, casing materials for wind power generation, and the like.

Typical products are described below with examples.

1. Semiconductor Sealing Material

A method for producing a semiconductor sealing material from the epoxy resin composition of the present invention is, for example, a method of sufficiently melt-mixing the composition, a curing accelerator, and additives such as an inorganic filler and the like, if required, by using an extruder, a kneader, a roll, or the like until the mixture becomes uniform. In this method, fused silica is generally used as the inorganic filler, but when the semiconductor sealing material is used as a semiconductor sealing material with high thermal conductivity for a power transistor and power IC, preferably used is high-filling silica such as crystalline silica, alumina, silicon nitride, or the like, which has higher thermal conductivity than that of fused silica, or fused silica, crystalline silica, alumina, silicon nitride, or the like. The inorganic filler is preferably used at a filling rate within a range of 30% to 95% by mass relative to 100 parts by mass of the epoxy resin composition. In particular, in order to attempt to improve flame resistance, moisture resistance, and solder crack resistance and to decrease the linear expansion coefficient, the filling rate is more preferably 70% by mass or more and still more preferably 80% by mass or more.

2. Semiconductor Device

A semiconductor package molding method for producing a semiconductor device from the epoxy resin composition of the present invention is, for example, a method including molding the semiconductor sealing material by using casting or a transfer molding machine or injection molding machine, and further heating at 50° C. to 250° C. for 2 to 10 hours.

3. Printed Wiring Board

A method for producing a printed wiring board from the epoxy resin composition of the present invention is, for example, a method including laminating the prepreg by a usual method, properly laminating a copper foil, and heating and pressure-bonding these at 170° C. to 300° C. for 10 minutes to 3 hours under a pressure of 1 to 10 MPa.

4. Build-Up Substrate

A method for producing a build-up substrate from the epoxy resin composition of the present invention includes, for example, the following steps: a first step (step 1) of applying the composition properly mixed with a rubber, a filler, etc. on a circuit substrate with a circuit formed thereon by using a spray coating method, a curtain coating method, or the like, and then curing the composition; a next step (step 2) of, if required, forming a hole such as a predetermined through hole portion or the like, forming irregularities by treatment with a roughening agent and washing the surface with hot water, and plating the surface with a metal such as copper or the like; and a step (step 3) of repeating the operations described above in order according to demand to alternately form, by building-up, a resin insulating layer and a conductor layer having a predetermined circuit pattern. The through hole portion is formed after the resin insulating layer is formed as the outermost layer. Also, the build-up substrate of the present invention can be formed by heating and pressure-bonding at 170° C. to 300° C. a copper foil with a resin, which is formed by semi-curing the resin composition on a copper foil, to a wiring substrate with a circuit formed thereon, thereby forming a roughened surface without the plating step.

5. Build-Up Film

In a method for producing a build-up film from the epoxy resin composition of the present invention, a build-up film can be produced by applying the composition on the surface of a support film (Y) used as a substrate and then drying the organic solvent by heating, spraying hot air, or the like to form a layer (X) of the composition.

Examples of the organic solvent preferably used in this method include ketones such as acetone, methyl ethyl ketone, cyclohexanone, and the like; acetate esters such as ethyl acetate, butyl acetate, cellosolve acetate, propylene glycol monomethyl ether acetate, carbitol acetate, and the like; carbitols such as cellosolve, butyl carbitol, and the like; aromatic hydrocarbons such as toluene, xylene, and the like; dimethyl formamide; dimethyl acetamide, N-methylpyrrolidone; and the like. In addition, the organic solvent is preferably used at such a ratio that the nonvolatile content is 30% to 60% by mass.

The thickness of the layer (X) formed is generally larger than the thickness of the conductor layer. The thickness of the conductor layer possessed by the circuit board is generally within a range of 5 to 70 μm, and thus the resin composition layer preferably has a thickness of 10 to 100 μm. In the present invention, the layer (X) of the composition may be protected by a protective film described later. The protection by the protective film can prevent dust adhesion and the like and flaws on the surface of the resin composition layer.

Examples of the support film and the protective film include polyolefins such as polyethylene, polypropylene, polyvinyl chloride, and the like; polyesters such as polyethylene terephthalate (may be abbreviated as "PET" hereinafter), polyethylene naphthalate, and the like; polycarbonate; and polyimide; and further include peel paper; metal foils such as a copper foil, an aluminum foil, and the like; and the like. In addition, the support film and the protective film may be subjected to matte treatment, corona treatment, mold release treatment, or the like. The thickness of the support film is not particularly limited, but is generally 10 to 150 μm and preferably within a range of 25 to 50 μm. The thickness of the protective film is preferably 1 to 40 μm.

The support film (Y) is peeled after laminated on the circuit board or after the insulating layer is formed by heat-curing. When the support film (Y) is peeled after the curable resin composition layer constituting the build-up film is heat-cured, dust adhesion or the like can be prevented in the curing step. When the support film is peeled after curing, the support film is generally subjected to mold release treatment in advance.

A multilayer printed circuit board can be produced by using the build-up film formed as described above. For example, when the layer (X) is protected by the protective film, these are peeled, and then the layer (X) is laminated by, for example, a vacuum lamination method on one or both surfaces of the circuit board so as to be in direct contact with the circuit board. The lamination method may be either a batch type or a continuous type using a roll. If required, the build-up film and the circuit board may be heated (preheated) according to demand before lamination. The preferred conditions of lamination include a pressure bonding temperature (lamination temperature) of 70° C. to 140° C., and a pressure bonding pressure of 1 to 11 kgf/cm² ($9.8 \times 10^4$ to $107.9 \times 10^4$ N/m²), and lamination is preferably performed under reduced pressure at air pressure of 20 mmHg (26.7 hPa) or less.

6. Conductive Paste

An example of a method for producing a conductive paste from the epoxy resin composition of the present invention is a method of dispersing conductive particles in the composition. The conductive paste can be used as a paste resin composition for circuit connection or an anisotropic conductive adhesive according to the type of the conductive particles used.

EXAMPLES

The present invention is described in further detail below by giving examples, but the present invention is not limited to these examples.

(Synthesis of Epoxy Resin)

Test Example 1

An epoxy resin was synthesized based on the reaction scheme represented by formula (28).

[Chem. 49]

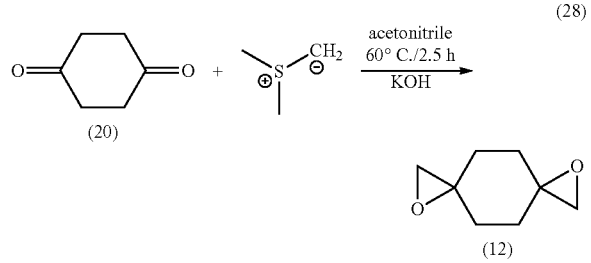

First, in a 500 mL two-neck flask, 49.47 g (0.315 mol) of trimethyl sulfonium bromide, 315 mL of acetonitrile, 1.05 mL (52.5 mmol) of water, and 70.70 g (1.26 mol) of KOH were added and stirred (60° C./5 min) by using a mechanical stirrer. Then, a solution prepared by dissolving 11.77 g (0.105 mol) of 1,4-cyclohexanedione in 105 mL of acetonitrile was added to an eggplant flask and again stirred (60° C./5 h). After the proceeding of the reaction was confirmed by TLC, the reaction mixture was cooled to room temperature and subjected to suction filtration (washing with methylene chloride) and liquid separation (methylene chloride/pure water) three times. Then, the organic layer was washed with saturated saline, dried with anhydrous sodium sulfate, and filtered, concentrated, and then dried under reduced pressure (r. t./ovn.) to produce 6.50 g (44%) of yellowish white solid. Next, the yellowish white solid was distilled under reduced pressure (1.5 torr, 100° C.), and the main distillate was recovered to obtain 4.52 g (23%) of white solid. As a result of 1H-NMR spectral analysis, $^{13}$C-NMR spectral analysis, and FT-IR spectral analysis (KBr) of the resultant white solid, it was confirmed that an epoxy resin represented by the formula (12) was obtained.

(Curing of Epoxy Resin with Polyfunctional Phenol Curing Agent)

Test Example 2

In a 50 mL eggplant flask, 1.0153 g (EEW=70.1 g/eq.) of the epoxy resin represented by the formula (12) produced in Test Example 1, 1.5063 g (HEW=104 g/eq.) of the ground curing agent (PN) represented by the formula (9), and acetone were added and stirred (r. t./40 min). After it was confirmed that the mixture was completely dissolved, 0.0252 g of the curing accelerator (2E4MZ-CN) represented by the formula (27) was added at 1 phr relative to the whole and again stirred (r. t./30 min). Then, the resultant mixture was concentrated by evaporation and dried under reduced pressure (r. t./ovn.) to produce a red viscous liquid. Next, the red viscous liquid was cast into a silicone casting mold plate while being melted at 80° C. Then, after deaeration (80° C./10 min), heat curing treatment was performed at 80° C. for 1 hour, 90° C. for 1 hour, 130° C. for 4 hours, 170° C. for 4 hours, and 200° C. for 5 hours in this order, producing a yellow transparent cured product.

(Curing of Epoxy Resin with Polyfunctional Amine Curing Agent)

Test Example 3

In a 50 mL eggplant flask, 1.8257 g (EEW=70.1 g/eq.) of the epoxy resin represented by the formula (12) produced in Test Example 1, 0.8074 g (active hydrogen equivalent=31.0 g/eq.) of the curing agent (MPDA) represented by the formula (11), and acetone were added and stirred (r. t./40 min). After it was confirmed that the mixture was completely dissolved, the resultant mixture was concentrated by evaporation and dried under reduced pressure (r. t./ovn.) to produce a white solid. Next, the white solid was cast into a silicone casting mold plate while being melted at 70° C. Then, after deaeration (70° C./5 min), heat curing treatment was performed at 70° C. for 1 hour, 90° C. for 1 hour, 130° C. for 3 hours, 170° C. for 3 hours, 200° C. for 3 hours, and 230° C. for 3 hours in this order, producing a blackish brown transparent cured product.

Test Example 4

A sample was formed as an existing polyfunctional phenol-cured epoxy resin cured product as follows. First, an epoxy resin (DGEBA: bisphenol A diglycidyl ether) (EEW=190 g/eq.) represented by formula (29) below was prepared.

[Chem. 50]

(29)

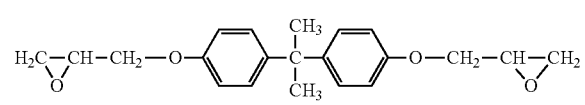

Next, the epoxy resin (DGEBA) was cured by using the curing agent (PN) and the curing accelerator (2E4MZ-CN) according to the same procedures as in Test Example 2, forming an existing polyfunctional phenol-cured epoxy resin cured product.

Test Example 51

A sample was formed as an existing polyfunctional amine-cured epoxy resin cured product as follows. First, an epoxy resin (DGEBA: bisphenol A diglycidyl ether) (EEW=190 g/eq.) represented by the formula (29) was prepared.

Next, the epoxy resin (DGEBA) was cured by using the curing agent (MPDA) according to the same procedures as in Test Example 3, forming an existing polyfunctional amine-cured epoxy resin cured product.

(Evaluation of Polyfunctional Phenol-Cured Epoxy Resin Cured Product)

Test Example 6

As a result of FT-IR spectral analysis (KBr) of the yellow transparent cured product (epoxy resin cured product) produced in Test Example 2, it was confirmed that the absorption disappeared at the same position as the absorption of epoxy groups of the epoxy resin represented by the formula (12). In addition, thermogravimetric analysis measurement (TGA measurement) was performed for the epoxy resin cured product by using TGA-50 manufactured by Shimadzu Corporation. The measurement was performed at a heating rate of 10° C./min in a $N_2$ gas atmosphere. Also, the glass transition temperature (Tg) of the epoxy resin cured product was measured by dynamic viscoelasticity measurement (DMA measurement) using DMS6100 manufactured by SII Nano Technology Inc. The measurement was performed at a heating rate of 5° C./min and a frequency of 1.0 Hz. Similarly, thermogravimetric analysis measurement (TGA measurement) and dynamic viscoelasticity measurement (DMA measurement) were further performed for the existing epoxy resin cured product produced in Test Example 4. The measurement results are shown in Table 1, FIG. 1, and FIG. 2. In Table 1, "$T_d5$" represents the 5% weight loss temperature of the sample, and "Tα10" represents the 10% weight loss temperature of the sample.

TABLE 1

|  | $T_{d5}$(° C.) | $T_{d10}$(° C.) | Tg(° C.) |
|---|---|---|---|
| Epoxy resin cured product of Test Example 2 (product of present invention) | 418 | 435 | 167 |

TABLE 1-continued

|  | $T_{d5}$(° C.) | $T_{d10}$(° C.) | Tg(° C.) |
|---|---|---|---|
| Epoxy resin cured product of Test Example 4 (existing product) | 394 | 405 | 131 |

Figure 2:
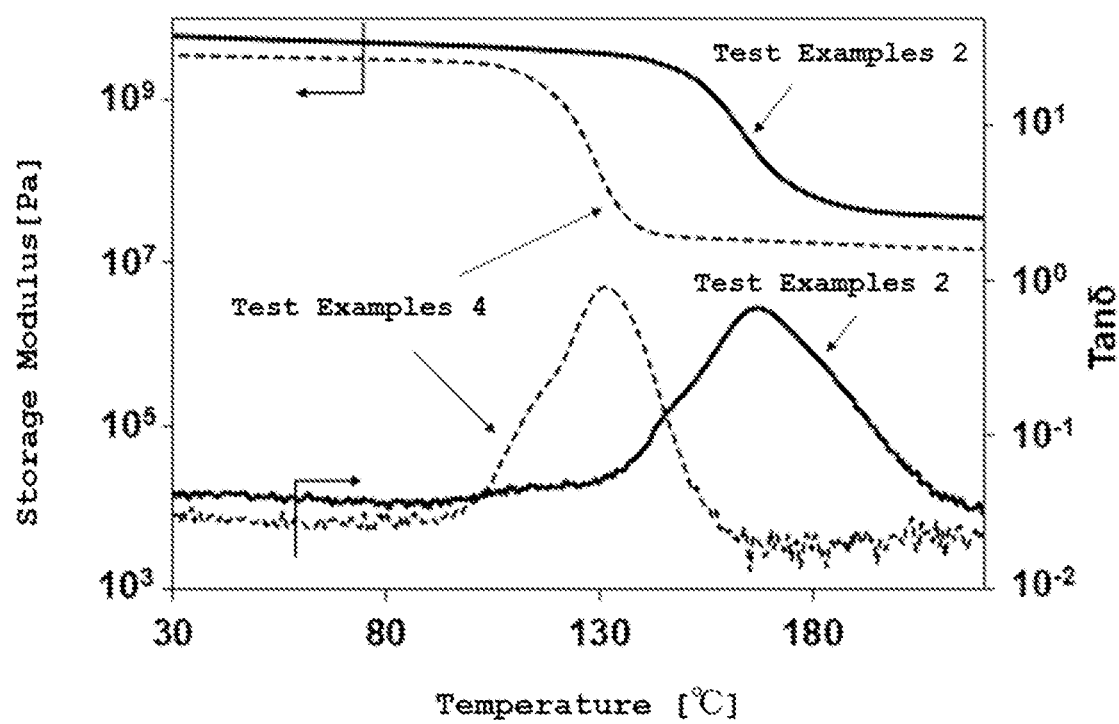
FIG. 2 is a graph showing DMA measurement results relating to Test Examples 2 and 4.

Table 1, FIG. 1, and FIG. 2 indicate that the epoxy resin cured product (product of the present invention) of Test Example 2 is excellent in heat resistance as compared with the epoxy resin cured product (existing product) of Test Example 4.

(Evaluation of Polyfunctional Amine-Cured Epoxy Resin Cured Product)

Test Example 7

As a result of FT-IR spectral analysis (KBr) of the brown transparent cured product (epoxy resin cured product) produced in Test Example 3, it was confirmed that the absorption disappeared at the same position as the absorption of epoxy groups of the epoxy resin represented by the formula (12). In addition, thermogravimetric analysis measurement (TGA measurement) was performed for the epoxy resin cured product by using TGA-50 manufactured by Shimadzu Corporation. The measurement was performed at a heating rate of 10° C./min in a $N_2$ gas atmosphere. Also, the glass transition temperature (Tg) of the epoxy resin cured product was measured by dynamic viscoelasticity measurement (DMA measurement) using DMS6100 manufactured by SII Nano Technology Inc. The measurement was performed at a heating rate of 5° C./min and a frequency of 1.0 Hz. Similarly, thermogravimetric analysis measurement (TGA measurement) and dynamic viscoelasticity measurement (DMA measurement) were further performed for the existing epoxy resin cured product produced in Test Example 5. The measurement results are shown in Table 2, FIG. 3, and FIG. 4. In Table 2, "$T_d5$" represents the 5% weight loss temperature of the sample, and "Tα10" represents the 10% weight loss temperature of the sample.

TABLE 2

|  | $T_{d5}$(° C.) | $T_{d10}$(° C.) | Tg(° C.) |
|---|---|---|---|
| Epoxy resin cured product of Test Example 3 (product of present invention) | 361 | 394 | 257 |
| Epoxy resin cured product of Test Example 5 (existing product) | 351 | 361 | 161 |

Figure 3:
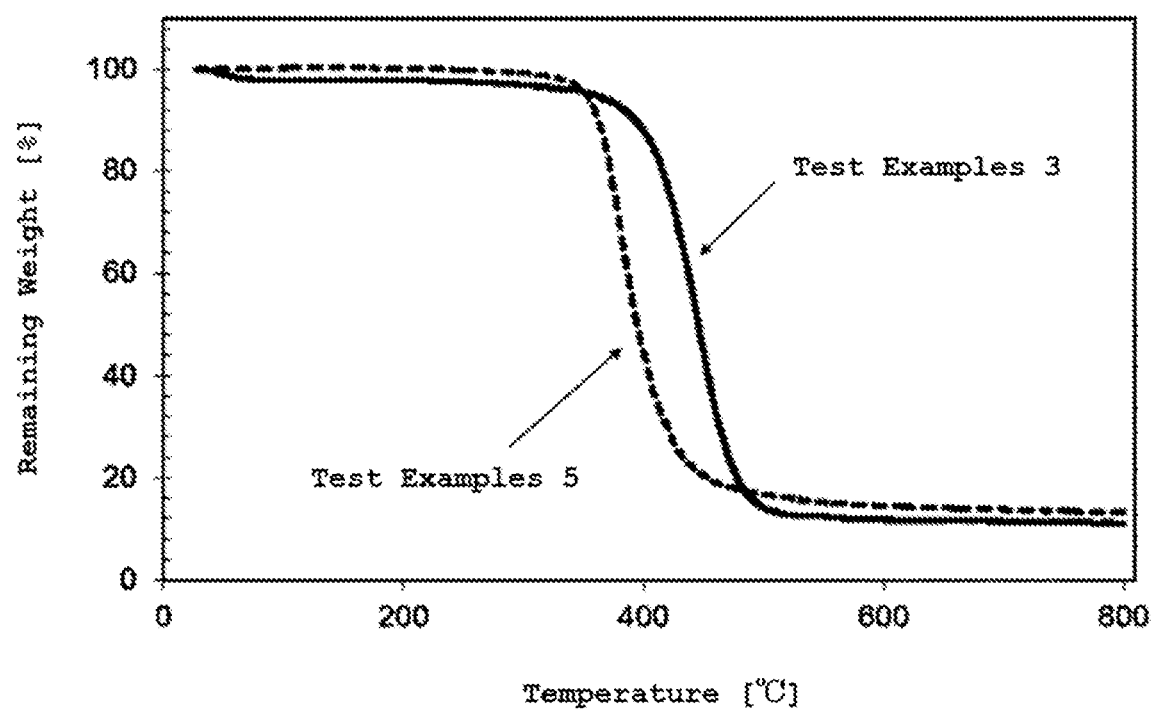
FIG. 3 is a graph showing TGA measurement results relating to Test Examples 3 and 5.
Figure 4:
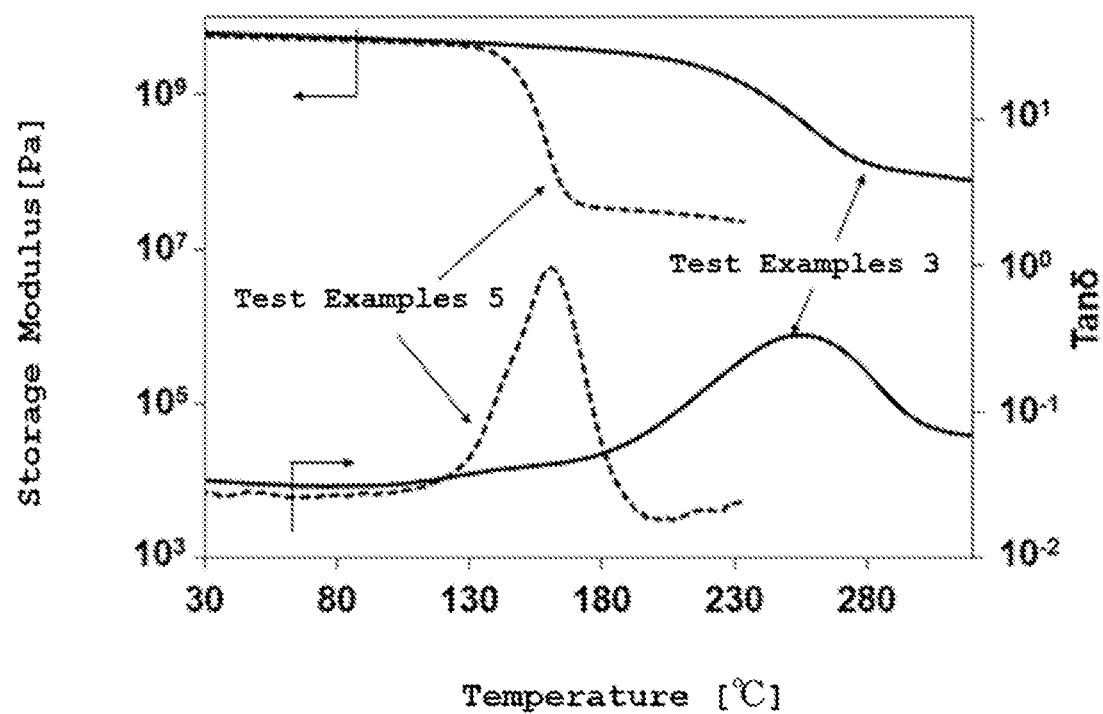
FIG. 4 is a graph showing DMA measurement results relating to Test Examples 3 and 5.

Table 2, FIG. 3, and FIG. 4 indicate that the epoxy resin cured product (product of the present invention) of Test Example 3 is excellent in heat resistance as compared with the epoxy resin cured product (existing product) of Test Example 5.

(Preparation and Physical Property Evaluation of Heat-Curable Resin Composition)

Test Examples 8 and 9

According to the equivalent compositions described in Table 3, the epoxy resin (DCD) represented by the formula (12) produced in Test Example 1 or bisphenol A-type liquid epoxy resin ("EPICLON 8505" manufactured by DIC Corporation, epoxy equivalent: 188 g/eq.) as an epoxy resin, and the active ester resin (active equivalent: 220 g/eq.) produced in Synthesis Example 1 below as a curing agent were melted and mixed at 150° C., and 0.5 phr of dimethylaminopyridine as a curing catalyst was further added.

Synthesis Example 1

In a flask provided with a thermometer, a dropping funnel, a cooling tube, a fractionating column, and a stirrer, 165 g of the addition reaction product (hydroxyl equivalent 165 g/equivalent, softening point 85° C.) of dicyclopentadiene and phenol, 144 g of 1-naphthol, and 1315 g of toluene were charged and dissolved under reduced-pressure nitrogen substitution in the system. Next, 200 g of isophthalic acid chloride was charged and dissolved under reduced-pressure nitrogen substitution in the system. Then, 434 g of a 20% aqueous sodium hydroxide solution was added dropwise over 3 hours while the inside of the system was controlled to 60° C. or less under nitrogen gas purging. After the completion of dropwise addition, the resultant mixture was reacted as it was for 1 hour by continuous stirring. After the completion of reaction, the reaction mixture was allowed to stand to separate between liquids, and a water layer was removed. Then, water was added to the remaining organic layer and stirred and mixed for about 15 minutes, and then the mixture was allowed to stand to separate between liquids, and the water layer was removed. This operation was repeated until the water layer become pH7, and then toluene or the like was distilled off under the conditions of heating and reduced pressure, producing an active ester resin (AE). The functional group equivalent of the active ester resin (AE) was 220 g/equivalent, and the softening point measured based on JIS K7234 was 130° C.

Next, a cured product was formed under conditions below, and dielectric tangent was evaluated by a method below. The evaluation results are shown in Table 3.

<Conditions for Forming Cured Product>

Curing condition: curing in a mold for 2 hours at 180° C., for 2 hours at 200° C., and for 2 hours at 230° C. Thickness after molding: 2 mm <Measurement of Dielectric Tangent>

The dielectric tangent at 1 GHz of a test piece was measured by using open coaxial resonance-type dielectric constant measuring apparatus "ADMS010c1" manufactured by AET Inc. according to JIS-C-2138 after being stored for 24 hours in a room at 23° C. and a humidity of 50% after absolute drying.

TABLE 3

|  |  | Test Example 8 (product of present invention) | Test Example 9 (existing product) |
|---|---|---|---|
| Epoxy resin | DCD | 24.1 parts by mass | — |
|  | EPICLON 850S | — | 46.1 parts by mass |
| Active ester-type curing agent | AE | 75.9 parts by mass | 53.9 parts by mass |
| Dielectric tangent (1 GHz) |  | 0.003 | 0.008 |

The results in Table 3 indicate that the epoxy resin cured product (product of the present invention) of Test Example 8 is excellent in dielectric tangent by about 40% as compared with the epoxy resin cured product (existing product) of Test Example 9. The higher-speed operation speed of a high-frequency device can be realized by a circuit board using the cured product.

The invention claimed is:

1. An epoxy resin represented by any one of formulae (1) to (8) and (30) to (32) below, wherein the epoxy resin is produced by reacting a sulfur ylide with a compound having a cyclohexanedione, cyclopentanedione, or cyclobutanedione backbone in an organic solvent selected from the group consisting of acetonitrile

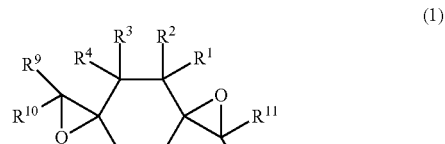
(1)

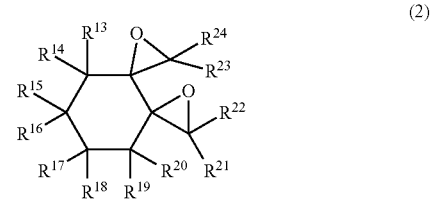
(2)

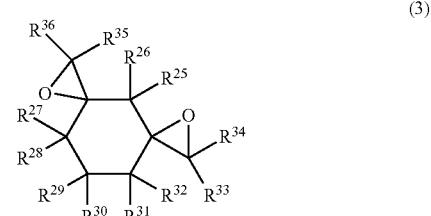
(3)

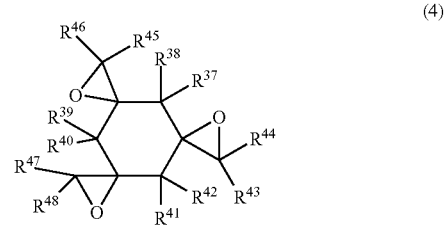
(4)

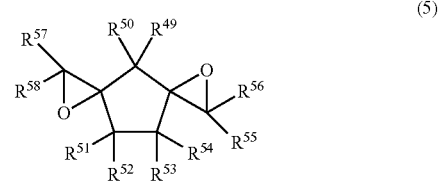
(5)

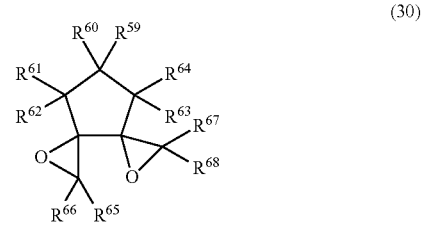
(30)

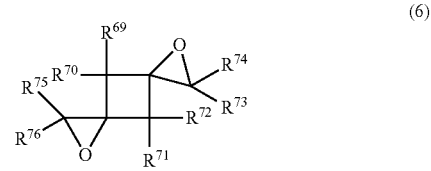
(6)

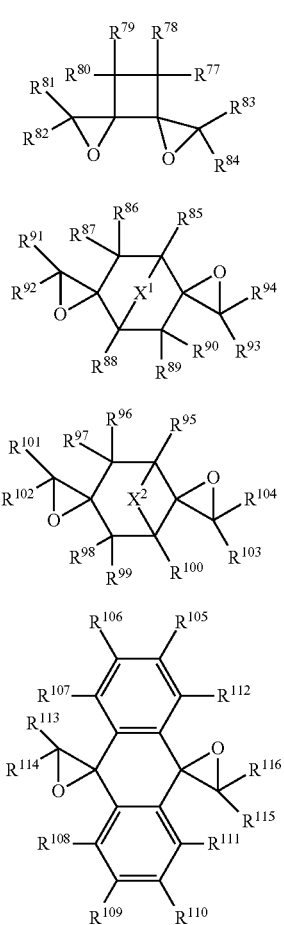

(31)

(7)

(32)

(8)

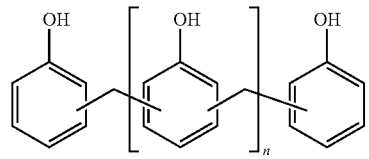

wherein, n is a positive integer.

4. An epoxy resin cured product produced by curing the epoxy resin according to claim 1 with a curing agent represented by formula (10)

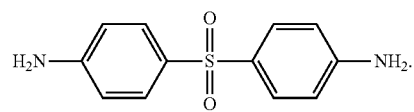

5. An epoxy resin cured product produced by curing the epoxy resin according to claim 1 with a curing agent represented by formula (11)

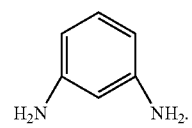

6. An epoxy resin cured product produced by curing the epoxy resin according to claim 1 with a curing agent represented by formula (36) below,

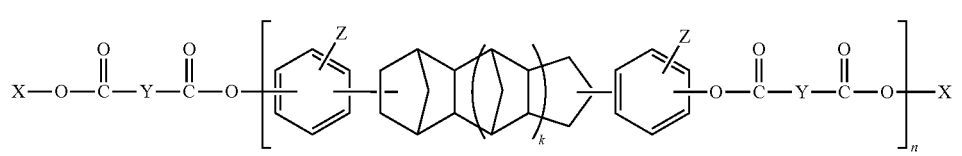

wherein, in the formulae (1) to (8) and (30) to (32), $R^1$ to $R^{116}$ are each independently a hydrogen atom, a halogen atom, a hydroxyl group, an alkoxy group, an aralkyloxy group, an aryloxy group, a nitro group, an amino group, an amide group, a carboxyl group, an alkyloxycarbonyl group, an aryloxycarbonyl group, a formyl group, a cyano group, an alkyl group, a cycloalkyl group, an aralkyl group, or an aryl group, and in the formulae (7) and (32), $X^1$ and $X^2$ are each independently a carbonyl group, an oxygen atom, an amino group (—N<), a sulfur atom, a sulfoxide group, a sulfonyl group, or a hydrocarbon group having 1 to 12 carbon atoms.

2. An epoxy resin cured product produced by curing the epoxy resin according to claim 1.

3. An epoxy resin cured product produced by curing the epoxy resin according to claim 1 with a curing agent represented by formula (9) below, wherein, in the formula, X is a benzene ring, a naphthalene ring, a benzene ring or naphthalene ring nuclear-substituted by an alkyl group having 1 to 4 carbon atoms, or a biphenyl group, Y is a benzene ring, a naphthalene ring, or a benzene ring or naphthalene ring nuclear-substituted by an alkyl group having 1 to 4 carbon atoms, Z is an alkyl group having 1 to 4 carbon atoms, k represents 0 or 1, and n is average repeat units of 0.25 to 3.0.

7. An epoxy resin composition comprising:
the epoxy resin represented by any one of the formulas (1) to (8) and (30) to (32) below; and
a curing agent,
wherein the epoxy resin is produced by reacting a sulfur ylide with a compound having a cyclohexanedione, cyclopentanedione, or cyclobutanedione backbone in an organic solvent selected from the group consisting of acetonitrile

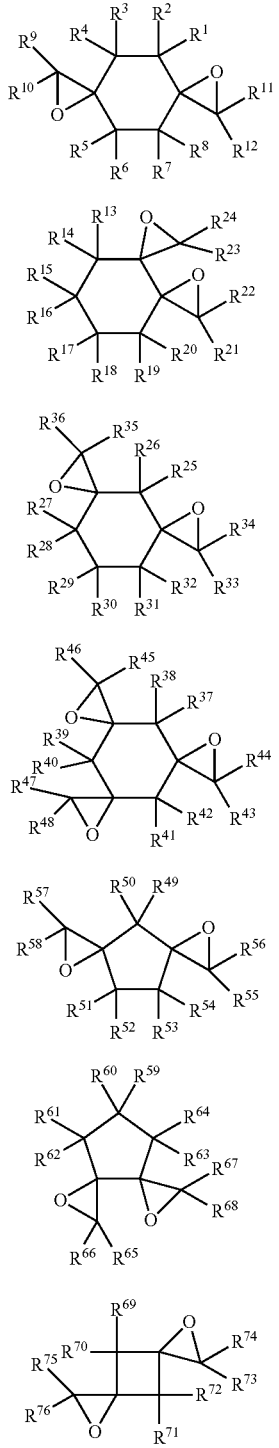

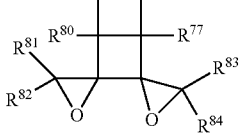

wherein, in the formulae (1) to (8) and (30) to (32), $R^1$ to $R^{116}$ are each independently a hydrogen atom, a halogen atom, a hydroxyl group, an alkoxy group, an aralkyloxy group, an aryloxy group, a nitro group, an amino group, an amide group, a carboxyl group, an alkyloxycarbonyl group, an aryloxycarbonyl group, a formyl group, a cyano group, an alkyl group, a cycloalkyl group, an aralkyl group, or an aryl group, and in the formulae (7) and (32), $X^1$ and $X^2$ are each independently a carbonyl group, an oxygen atom, an amino group, a sulfur atom, a sulfoxide group, a sulfonyl group, or a hydrocarbon group having 1 to 12 carbon atoms.

8. The epoxy resin composition according to claim 7, wherein the curing agent is at least one of compounds represented by formulae (9) to (11) and (36) below,

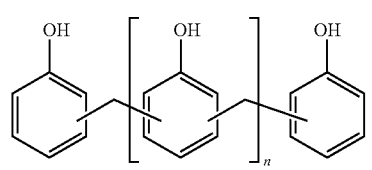

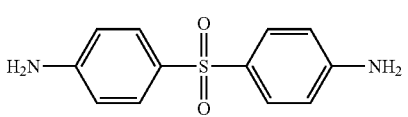

-continued

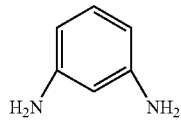
(11)

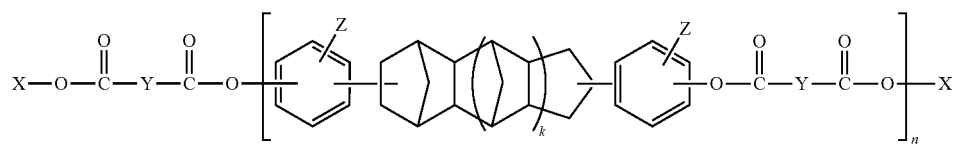
(36)

wherein, in the formulae, X is a benzene ring, a naphthalene ring, a benzene ring or naphthalene ring nuclear-substituted by an alkyl group having 1 to 4 carbon atoms, or a biphenyl group, Y is a benzene ring, a naphthalene ring, or a benzene ring or naphthalene ring nuclear-substituted by an alkyl group having 1 to 4 carbon atoms, Z is an alkyl group having 1 to 4 carbon atoms, k represents 0 or 1, and n is average repeat units of 0.25 to 3.0.

* * * * *